Oct. 1, 1968    R. E. BOWLES    3,403,563
FLUID STREAM MOTION TRANSDUCER
Filed Sept. 21, 1962    2 Sheets-Sheet 1
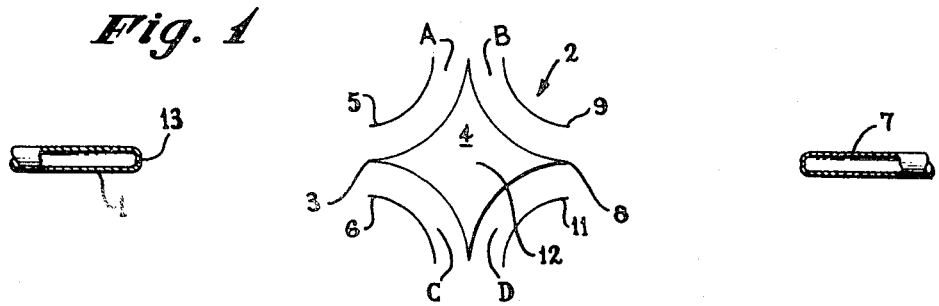
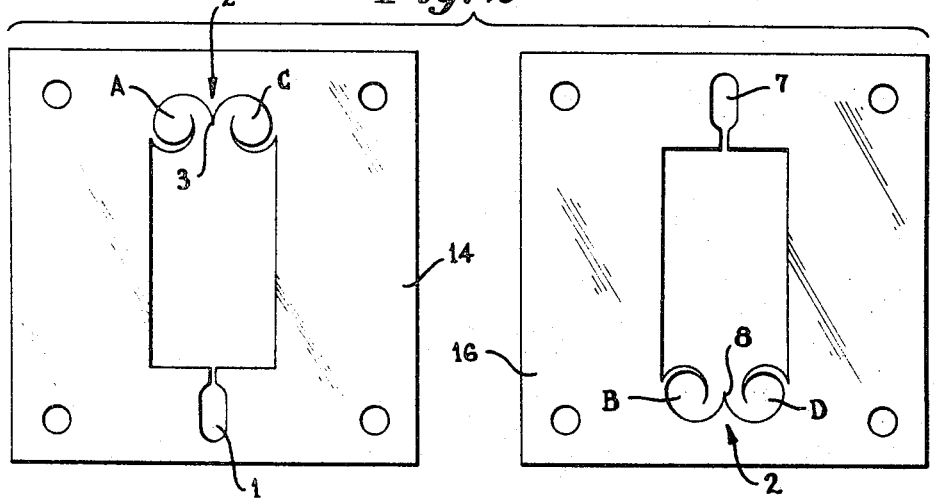
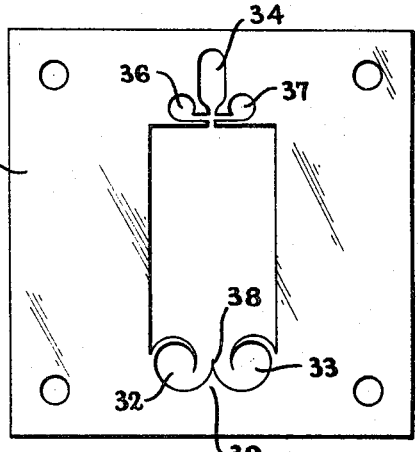
INVENTOR
ROMALD E. BOWLES
BY S.J. Rotondi, A.J. Dupont & R.C. Lucke
ATTORNEY Oct. 1, 1968 R. E. BOWLES 3,403,563
FLUID STREAM MOTION TRANSDUCER
Filed Sept. 21, 1962 2 Sheets-Sheet 2
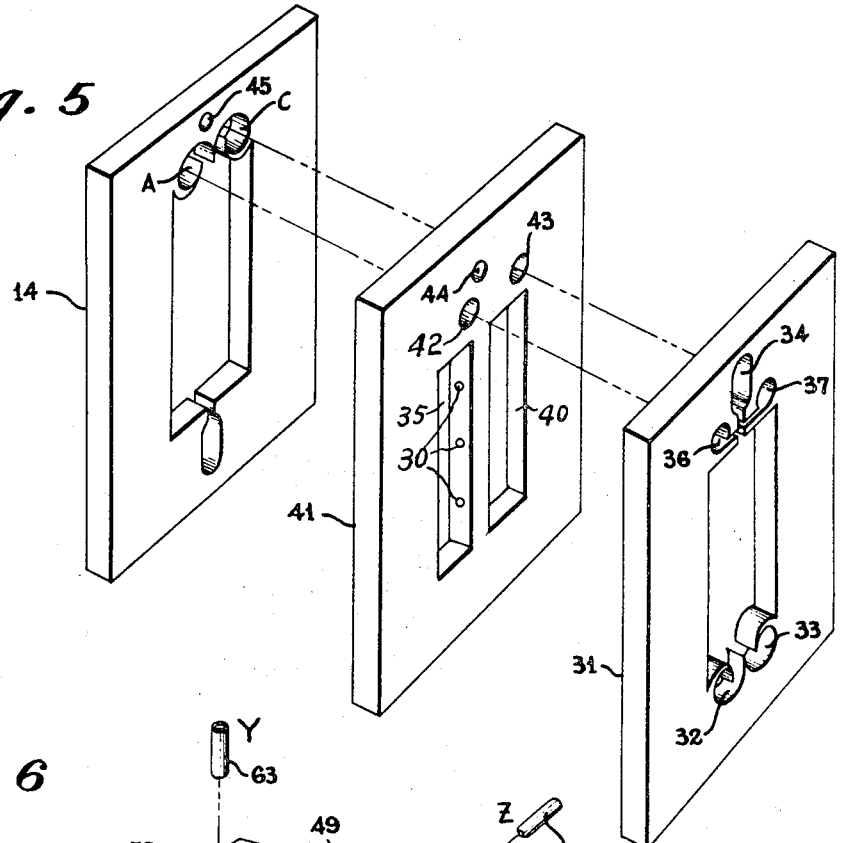
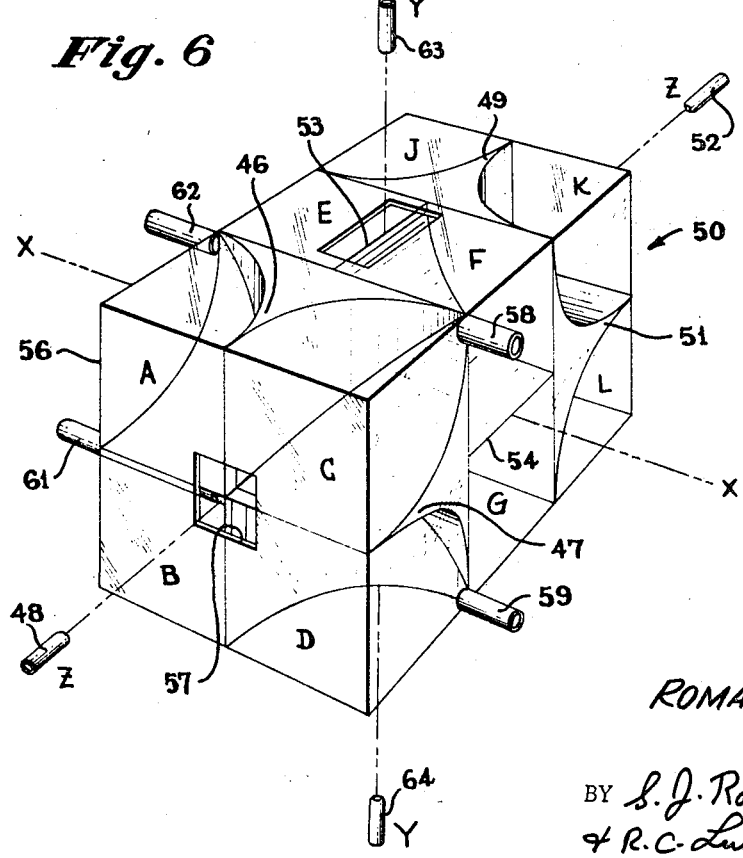
INVENTOR
ROMALD E. BOWLES
BY S. J. Rotondi, A. S. Dupont
& R. C. Lucke
ATTORNEY

# United States Patent Office 3,403,563
Patented Oct. 1, 1968

3,403,563
FLUID STREAM MOTION TRANSDUCER
Romald E. Bowles, Silver Spring, Md., assignor to the United States of America as represented by the Secretary of the Army
Filed Sept. 21, 1962, Ser. No. 226,196
6 Claims. (Cl. 73—505)

The invention described herein may be manufactured and used by or for the Government for governmental purposes without the payment to me of any royalty thereon.

The present invention relates to rate measuring devices and more particularly to a device or apparatus for measuring the angular rate of rotation of a body about one or more of its principal axes which apparatus or device is completely compensated for effects of linear acceleration.

It is an object of the present invention to provide an apparatus for measuring angular rate of rotation of a body which apparatus employs one or more streams of fluid and requires no moving parts other than the fluid streams.

It is another object of the present invention to provide an apparatus for measuring the angular rate of rotation of a body which apparatus is, within limits, completely insensitive to the effects of linear acceleration to which the body may be subjected.

It is another object of the present invention to provide a device and apparatus for measuring angular rate of rotation of a body about its three principal axes which apparatus employs three pairs of opposed moving streams of fluid in order to render the apparatus insensitive to linear acceleration.

It is still another object of the present invention to provide an apparatus for measuring the angular rate of rotation of a body about two of its principal axes which apparatus employs two opposed moving streams of fluid to provide for elimination of effects of linear acceleration.

The above and still further objects, features and advantages of the present invention will become apparent upon consideration of the following detailed description of several embodiments thereof, especially when taken in conjunction with the accompanying drawings, wherein:

FIGURE 1 is a schematic fluid flow diagram illustrating the basic principles of linear acceleration compensation employed in the present invention;

FIGURE 2 is a view in elevation of a first physical embodiment of an apparatus for sensing angular rate of rotation as provided by the present invention;

FIGURE 3 is a side view in elevation of an assembly employing the basic elements illustrated in FIGURE 2;

FIGURE 4 is a front view of a basic unit as illustrated in FIGURE 2 modified to incorporate introduction of control signals and to provide internal amplification of signals;

FIGURE 5 is an exploded view in perspective illustrating a model employing the units of FIGURES 2 and 4; and FIGURE 6 is a perspective view of an apparatus for measuring rotation about three mutually perpendicular axes of rotation.

Referring now specifically to FIGURE 1 of the accompanying drawings, there is illustrated an apparatus for measuring the angular rate of rotation of a body, in which the effects of linear acceleration have been eliminated. The apparatus comprises a fluid nozzle 1 adapted to direct a first stream of fluid toward a receptor generally designated by the reference numeral 2. Lying along the axis of the nozzle 1 and displaced to the right thereof is an apex 3 of a divider 4 of the receptor 2. The divider 4 is symmetrical with respect to the axis of nozzle 1 and, in conjunction with a first side wall 5, defines a channel A and, in conjunction with a side wall 6, defines a second channel C. A second nozzle 7, axially aligned with and opposed to the nozzle 1, is adapted to establish a stream of fluid flowing toward a second apex 8 of the divider 4. The apex 8 lies along the axis of nozzle 7 and the divider 4 forms, in conjunction with side walls 9 and 11, channels B and D, respectively.

If it is assumed that the apparatus illustrated in FIGURE 1 rotates in the plane of the page about any axis; for instance, an axis 12, the arcuate distance traveled by the apex 3 of the divider 4 relative to the exit of nozzle 1 during the transit time of the fluid from the nozzle 1 to the apex 3 is determined by the equation $$\theta r = \frac{\omega r^2}{V} \quad (1)$$

where $\theta r$ is arc length; that is, the displacement of the apex 3 from the center line of the stream during transit of the stream, $\omega$ is the angular rate of rotation about the axis 12, $r$ is the distance from the nozzle 1 to the apex of the divider 3 and V is the relative speed of the stream of fluid issuing from the nozzle 1. By maintaining the speed of the beam constant, Equation 1 becomes $$\theta r = K\omega \quad (2)$$

It is seen therefore that the displacement of the stream issuing from the nozzle 1 relative to the apex 3 during the transit time of the stream from the nozzle to the apex is directly proportional to the angular velocity of the apparatus and that by measuring the arc length, the angular rate of rotation may be determined. Arc length may be measured by determining the difference in fluid flows to the channels A and C. Fluid flow may be measured by various known techniques, such as hot wire anemometers, manometers and other devices of the mechanical, electrical or pneumatic type.

In operation, and assume initially that the apparatus is not rotating about the axis 12, the stream issuing from the nozzle 1 flows along the center line of the nozzle and divides equally at the apex 3 of the divider 4 so that equal quantities of fluid flow through the channels A and C. In these circumstances, equal output signals are developed by the measuring apparatus associated with channels A and C indicating that the apparatus is not rotating. If the apparatus illustrated in FIGURE 1 rotates about the axis 12, the fluid issuing from nozzle 1 rotates at a faster rate than the apex 3 due to its greater radius. Assuming that the device is rotating clockwise, more of the fluid leaving the nozzle 1 enters the channel A than enters the channel C and this difference in flow rates is a measure of the angular rate of rotation. With respect to the fluid issuing from the nozzle 7 under the above circumstances, more fluid enters the channel D than enters the channel B and the difference between the flow to channels D and B is the same as the difference between the flows to the channels A and C. Therefore, the signals derived from channels A and D may be added to one another and the signals from the channels B and C added to one another with the latter quantity being subtracted from the former quantity. This is illustrated in the equation $$\theta r \alpha (A+D) - (B+C) \quad (3)$$

where the letters of the alphabet in Equation 3 designate the signals derived from the channels bearing the corresponding letters.

Rotation of the apparatus about any of the other principal axes of the device has negligible effect upon the measurements produced or derived from the apparatus of FIG- URE 1. Specifically, rotation about the axis through the nozzles 1 and 7 has negligible effect upon the position of the streams relative to the apices of the receptor apparatus 2. Also, rotation about an axis perpendicular to the axis of the nozzles and in the plane of the page has negligible effect upon the apparatus. Therefore, the apparatus of FIGURE 1 measures rotation of the device only about the axis 12 or any other axis which is parallel to the axis 12.

It should be understood that, regardless of the location of the axis 12 relative to the structure of FIGURE 1, the effects produced are precisely the same. For instance, if the rotation is about an axis 13 at the exit of the nozzle 1, the Equation 3 is still correct. Specifically, and assume counterclockwise rotation of the apparatus, the stream issuing from the nozzle 1 provides more fluid to the channel C than to the channel A since the fluid issuing from the nozzle has no rotational component whereas the apex 3 of the receptor 2 has a counterclockwise rotation. On the other hand, the fluid exiting from the nozzle 7 has a greater radius than and therefore a greater tangential velocity than the apex of the receptor 2. Consequently, more fluid enters the channel B than the channel D. If Equation 3 provides a positive signal for clockwise rotation, then the signal produced as a result of counterclockwise rotation is negative since the terms B and C of Equation 3 are greater than the terms A and D thereof.

A beam deflection device of the type employing the principles illustrated in FIGURE 1 is normally sensitive to linear acceleration. Consider for a moment the left-hand device of FIGURE 1; that is, only that portion including the nozzle 1 and the structures defining channels A and C. If the apparatus is subject to an upward linear acceleration, the average velocity of upward movement of the apex 3 is greater than the upward velocity of the stream approaching the apex, since the fluid, once it leaves the nozzle 1, is no longer subject to accelerating forces whereas the apex 3 continues to be subject to the accelerating force. Therefore, in the presence of upward acceleration, a greater proportion of the fluid leaving the nozzle 1 enters the channel C than the channel A. Conversely, if acceleration is downward, more fluid enters A than enters C. Thus, if the device is as described above, it is not possible to separate the signal due to linear acceleration from the signal due to angular rate of rotation.

Consider now the entire device illustrated in FIGURE 1, in the presence of upward linear acceleration. The movement of the receptor 2 relative to both of the free beams issued by nozzles 1 and 7 respectively is precisely the same and the amount of fluid flowing to channels C and D is increased by the same amount. If acceleration is downward, then the same increased proportion of fluid is provided to the channels A and B if the acceleration is the same in both cases. Referring to Equation 3, if the quantities A and B are equal and the quantities C and D are equal then the equation becomes equal to zero. In other words, the linear acceleration terms have canceled one another. If both angular and linear accelerations are present then, again, the linear acceleration terms cancel whereas the angular acceleration terms remain.

In a non-mathematical sense, it can be seen that if the device of FIGURE 1 is subject to angular acceleration, the streams are deflected toward opposite channels such as A and D which are summed; whereas, if linear acceleration is present, the streams are deflected toward adjacent channels such as C and D which are subtracted from one another. Thus, in one case, the terms tend to increase the signal whereas in the other case, they eliminate the signal.

The apparatus of FIGURE 1 is purely diagrammatic and, although it is possible that a physical embodiment could be built which resembles FIGURE 1, it is doubtful that such a device would be built.

Referring specifically to FIGURE 2 of the accompanying drawings, there is illustrated an apparatus constituting a physical embodiment of the diagrammatic apparatus presented in FIGURE 1. The apparatus includes two plates 14 and 16 having identical devices formed thereon, but which are rotated 180° relative to one another. Each of these devices comprises a flat plate having appropriate channels formed therein and extending therethrough to provide one-half of the apparatus illustrated in FIGURE 1. The reference numerals employed in FIGURE 2 correspond to the reference numerals in FIGURE 1 so that a physical embodiment of the invention, as illustrated in FIGURE 2, can be related to the schematic drawing of FIGURE 1 employed for purposes of explanation. A power nozzle 1 directs a stream of fluid at an apex 3 of a portion of a receptor mechanism 2. The receptor comprises enlarged regions disposed on opposite sides of the apex 3 of the divider to provide channels A and C. The nozzle 1, channels A and C, and the space therebetween are formed by cutting through the plate 14. The plate 16 includes a nozzle 7, the channels B and D, and the apex 8 of the divider mechanism 4.

In practice, the plates 14 and 16 are laid one on top of the other with a separator therebetween to provide a module capable of performing the functions of the device of FIGURE 1.

Referring now specifically to FIGURE 3, a gasket 17 is disposed between the plates 14 and 16 and the plates 14 and 16 are clamped between two end plates 18 and 19. All of the plates are arranged such that a fluid seal is provided therebetween so that a completely enclosed system may be provided. The nozzle 1 of the plate 14 is connected via an aperture 21 in the plate 18 to a pipe 22 leading to a suitable source of pressurized fluid. Similarly, the nozzle 7 is connected via an aperture 23 in the plate 19 to a pipe 24 leading to the same source of pressure as the pipe 22. Thus, fluid under pressure is supplied to both of the nozzles 1 and 7 so that they may provide streams of fluid flowing towards their respective apices 3 and 8. The channels A and C of FIGURE 2 are connected through appropriate apertures in the plate 18 to pipes 26 and 27 which return to the low pressure side of the pump supplying fluid to the pipe 22. The flow measuring devices may be arranged in the channels A and C or in pipes 26 and 27 depending upon the type of measuring apparatus employed. The passages B and D of plate 16 are connected to pipes 28 and 29 which are also returned to the low pressure side of the pump supplying fluid to the pipes 22 and 24. Again the flow measuring devices may be arranged in these pipes or elsewhere as appropriate.

The pressures on opposite sides of each fluid stream such as the stream issuing from the nozzle 1 of plate 14 or nozzle 7 of plate 16 must be equalized to prevent extraneous factors from effecting the results obtained from the apparatus. Such a factor could be boundary layer effects produced by interaction between the stream and the sidewalls of the chamber existing between, for instance, the nozzle 1 and receptor 2. This factor may be rendered substantially ineffective by equalizing the pressures on opposite sides of the fluid streams in any known manner. For instance, the two sides of the chambers of plates 14 and 16 may be vented to the atmosphere through plates 18 and 19, respectively, in FIGURE 3 or the technique illustrated in FIGURE 5 and described subsequently may be employed.

If it is desired to employ the signals produced by the apparatus of FIGURE 3 for control purposes, it may be necessary to amplify the fluid signals produced. Amplification may be provided externally of the apparatus of FIGURE 3 by employing fluid amplifiers as described in co-pending patent application Ser. No. 51,896 of Billy M. Horton, filed Sept. 19, 1960 for Fluid Amplifier System. If it is desired to provide internal amplification in a system such as that of FIGURE 3, then at least one of the devices of FIGURE 2 may be modified as illustrated in FIGURE 4 of the accompanying drawings.

In FIGURE 4, there is provided a plate 31 having passages formed therethrough defining a power nozzle 34, control nozzles 36 and 37, channels 32 and 33 and an enlarged open region between the nozzles and the channels. There is provided a divider 39 having an apex 38 arranged along the center line of the nozzle 34, the divider providing a separator between outlet passages 32 and 33. In such a device, if fluid is provided to the nozzles 34 and 36, the main stream developed by nozzle 34 is deflected to the right as viewed in FIGURE 4 and a larger proportion of the fluid is directed to the outlet passage 33 than the outlet passage 32. If the signal supplied to the nozzle 36 is sufficiently great, all of the fluid is diverted to the channel 33. On the other hand, if fluid is supplied to the nozzles 34 and 37, the fluid issuing from the nozzle 34 is diverted partially or wholly, depending upon the intensity of the fluid flow from the nozzle 37, to the outlet channel 32. If fluid is supplied to all three of the nozzles 34, 36 and 37, then the main stream of fluid developed by the nozzle 34 may or may not be diverted to one or the other of the channels 32 or 33 either partially or wholly depending upon the relative quantity, pressure or energy of the fluid supplied to the nozzles 36 and 37. The important feature of the apparatus of FIGURE 4 is that a fluid parameter of the stream issuing from the nozzle 34 is amplified as it appears at the outlet channels relative to the corresponding parameter of the fluid applied to the control nozzles. Thus, the device of FIGURE 4, depending upon its design, may provide at the outlet channels a fluid whose pressure, energy or mass flow has been amplified relative to the same parameter of the signal provided to one or the other or both of the control nozzles 36 and 37. Amplification factors of ten or more are available from such devices. These devices are inherently differential amplifiers since if different signals are supplied to the nozzles 36 and 37, the output signal is a function of the difference between the input signals.

In order to provide internal amplification in the system of FIGURE 3, a device such as that provided in the plate 14 of FIGURE 2 is combined with a device as illustrated in FIGURE 4 and reference is now made to FIGURE 5 of the accompanying drawings.

FIGURE 5 is a three-dimensional exploded view of the plates 14, 31 and a divider 41 employed to isolate the passages of the plates 14 and 31 except at the locations defined by orifices 42, 43 and 44 of the plate 41 and an additional orifice 45 of the plate 14. The orifices 44 and 45 are employed to feed fluid to the power nozzle 34 in the plate 31. The orifices 42 and 43 connect the channels A and C of the plate 14 to the control nozzles 36 and 37, respectively, of the amplifying device formed in the plate 31. This arrangement produces a cascading of the beam devices formed in plates 14 and 31 and internal amplification of the rate signal but does not provide complete compensation for linear acceleration. More particularly, the difference between fluid flows to the channels A and C is proportional to the rate of rotation of the plate 14. These flows, when applied through orifices 42 and 43 to control nozzles 36 and 37, deflect the stream issued by the power nozzle 34 and produce a variation of fluid flows to outlet channels which is amplified by the gain of the stage. In addition, the effect of angular rotation on the beam in traveling from the region of the nozzles 34, 36 and 37 to the channels 32 and 33 further multiplies the signal gain. In a practical system, gains of ten to twenty are easily achieved with the device illustrated in FIGURE 5.

Equalization of the pressures on opposite sides of the streams issued by nozzles 1 and 34 is effected by cutting slots 35 and 40 in the plate 41. These slots extend through the plate 41 and communcate with the chambers of both plates 14 and 31. Apertures 30 extend through the bar defined by slots 35 and 40 so as to permit equilization of pressures in the slots and therefore on opposite sides of both chambers.

Difficulty with the system of FIGURE 5 arises, however, since the linear acceleration signal developed in the device 14 has an effect mutiplied by the gain of the stage over the compensating signal developed in the device 31. Thus, linear acceleration compensation is lost in such a device. However, complete compensation may be achieved by employing two sets of the devices illustrated in FIGURE 5 with the amplifying devices formed in the device 14 of the two sets being directed in opposite directions as are the amplifying devices formed in the plates 14 and 16 of FIGURE 2. Such an arrangement provides for complete linear acceleration compensation and at the same time provides a gain of ten to twenty over that available when only a single module of the type of FIGURE 3 is employed.

In any system of the type with which the present invention is concerned, it may be desirable to introduce control signals into the system. Provision for the introduction of control signals is easily achieved by employing a second plate 31 in FIGURE 5 for the plate 14. Control signals may then be applied to the control nozzles 36 and 37. Such signals may be derived from the pilot or from a guidance system.

The apparatus illustrated in FIGURES 1 through 5 are each sensitive to angular rates of rotation about a single axis. It is, of course, apparent that three such devices may be employed to sense rotation about three principal axes of a body by arranging each one to be sensitive to rotation about a different one of these axes. Another method for accomplishing this result is illustrated in FIGURE 6 of the accompanying drawings and requires only a total of four nozzles and one receptor device. The receptor comprises a three-dimensional structure generally designated by the reference numeral 50 having twelve distinct compartments designated by the letters A through L. The compartments H and I cannot be seen in FIGURE 6 but constitute the two rearward, lower left-hand compartments. The device 50 comprises a forward portion divided into four quadrants A through D by means of intersecting double dividers 46 and 47 appropriately contoured to provide knife-edge apices. The dividers 46 and 47 are curved wedges which expand away from the knife edges to provide dividers which are of the general form illustrated in FIGURE 2. A stream of fluid is normally directed at the intersection of the apices of the dividers 46 and 47 by means of a nozzle 48. A pair of dividers 49 and 51 of the receptor 50 are located at the rear of the device and provide intersecting apices directed away from the nozzle 48 and toward a nozzle 52 lying along the same axis as the nozzle 48. The apparatus thus far described is sensitive to rotation about either or both the X and Y axes and may be employed alone for this purpose. If, as is the case here, it is desired to employ only a single receptor for detecting rotation about all three axes then the device of FIGURE 6 is employed and further comprises intersecting dividers 53 and 54 arranged between the dividers 46, 47 on the one hand, and dividers 49 and 51 on the other to provide the chambers E, F, G and H. The entire divider-receptor arrangement is enclosed within the box 56 having suitably arranged openings therein to receive the fluid from the various nozzles. For instance, there is an opening defined by the line 57 which exposes the intersection of the dividers 46 and 47 so that fluid from the stream 48 may enter the apparatus. The fluid directed to the various channels A, B, C and D is taken off through pipes 58, 59, 61 and 62 to return the fluid to the low pressure side of the pump supplying the nozzle 48. Similar pipes are connected through the box 56 to communicate with the chambers E, F, G and H which receive fluid from nozzles 63 and 64 respectively having a common vertical axis. Suitable pipes are also provided for taking fluid from the passages J, K, L and M which receive fluid from the nozzle 52.

In operation, if the apparatus is rotated about the

Y axis, the apex of the divider 46 is displaced relative to the stream issued from the nozzle 48 and while the apex of the divider 49 is displaced relative to the stream issued from the nozzle 52. In order to sense the rotation about the Y axis the signals produced as a result of flow to the various channels are combined as indicated in Equation 4

$$Y_a = (C+D+I+J) - (A+B+K+L) \qquad (4)$$

The signal produced, as previously indicated, is fully compensated relative to linear acceleration but produces the maximum signal available for angular acceleration since all signals produced by flow to all passages are combined. If rotation is about an X axis, then signals are combined in accordance with Equation 5 which is $$X_a = (A+C+I+L) - (D+B+J+K) \qquad (5)$$

This equation again combines all signals produced to produce a maximum output but again completely eliminates any signal due to linear acceleration. It will be noted that the combinations of signals required to sense rotation about the X and Y axes are derived from the same channels but are employed in different combinations for the two equations. Therefore, in a system of this type, it is sometimes preferable to convert the signal indicating flow to each of the chambers to an electrical signal by means of, for instance, a hot wire anemometer and then combine the signal in electrical summing and differential amplifiers, as required, to derive the necessary indications.

When rotation of the of the device of FIGURE 6 is about the Z axis, signals are combined in accordance with Equation 6

$$Z_a = (E+G) - (F+H) \qquad (6)$$

These signals are, of course, independent of any of the signals derived from the channels A through D and I through L.

As previously indicated, the channels E, F, G and H may be eliminated and the dividers 46 and 47 on the one hand backed up to and abutting the dividers 49 and 51. In this case, the device is sensitive to rotation about the X and Y axes only and rotation about the Z axis may be detected by employing one of the units illustrated in FIGURE 3 or FIGURE 5.

It should be noted that, although the device has been described as one in which the fluid streams, such as the streams issued by nozzles 1 and 7 of FIGURE 1, are either opposed or adjacent one another, this is not a condition of operation of the apparatus. The only necessary condition relative to the two streams employed to provide linear acceleration compensation is that they lie in parallel planes and that their nozzle axes be parallel. As an example, a system employing the plates 14 and 16 may take the form as illustrated in FIGURE 2 with the plates lying side by side rather than being stacked one on top of the other.

As previously indicated, the conversion of the fluid signals to electrical signals may be effected by means of hot wire anemometers and the various combinations of signals required may be effected in electrical summing and differential amplifiers. For instance, and reference is now made to Equation 4, individual hot wires are located in the A, B, C, D, I, J, K and L channels or the passages leading therefrom. These hot wire units are connected into circuits for detecting their variations in resistance so as to produce an electrical output signal indicative of such variation. The signals representing variations in fluid flow in the C, D, K and L channels may be supplied directly to a single summing amplifier and the signals indicative of fluid flow in the A, B, I and J channels are connected to a second summing amplifier. The two signals available from the two summing amplifiers are then applied to a differential amplifier to produce a signal having a magnitude indicative of the difference between the two signals and having a sign as determined by which of these two signals has the greater amplitude. The techniques set forth immediately above are completely conventional and do not form any part of the present invention.

While I have described and illustrated several embodiments of my invention, it will be clear that variations of the details of construction which are specifically illustrated and described may be resorted to without departing from the true spirit and scope of the invention as defined in the appended claims.

What I claim is:

1. A device for measuring the angular rate of rotation of a body about an axis comprising a pair of flat plates each including passages therein providing a power nozzle for directing a stream of fluid along an axis, a divider located downstream of each power nozzle for defining two fluid outlet channels symmetrically located on opposite sides of said axis, said flat plates being stacked one above the other with the power nozzles of each plate located so as to establish parallel streams of fluid flowing in opposite directions, means for isolating the fluid streams produced by the power nozzles from one another, and passage means for communicating with said power nozzles and said outlet channels.

2. A device for measuring the angular rate of rotation of a body about an axis comprising a pair of plates each including passages therein providing a power nozzle for directing a stream of fluid along an axis, a divider means located downstream of said power nozzle for defining two fluid outlet channels symmetrically arranged on opposite sides of said axis, one of said plates having a pair of control nozzles disposed on opposite sides of said power nozzle for directing fluid streams against said fluid stream issued by said power nozzle, said flat plates being stacked one above the other with the power nozzles of each plate located so as to establish parallel streams flowing in opposite directions, means for isolating the fluid streams discharged by said power nozzles from one another, and passages extending through said means for isolating the fluid streams, said passages connecting one of said outlet passages in the other of said plates with one of said control nozzles in said one of said plates.

3. A device for measuring the angular rate of rotation of a body about an axis comprising a pair of flat plates each including passages therein providing a power nozzle for directing a stream of fluid along an axis, a divider means located downstream of said nozzle for defining two fluid outlet channels symmetrically located on opposite sides of said axis, said flat plates being arranged with the power nozzles associated therewith located so as to establish parallel streams of fluid flowing in opposite directions, top and bottom plates enclosing said flat plates therebetween and passages extending through at least one of said enclosing plates communicating with said power nozzles and at least one pair of outlet channels.

4. A system for measuring the angular rate of rotation of a body about an axis comprising means for establishing at least two streams of fluid having substantially parallel axes and flowing in opposite directions, the axes of said streams lying at an angle other than zero degrees to the axis of rotation of said body, plural passage means positioned to directly receive portions of the oppositely directed streams of fluid, each of said passage means producing fluid signals having an amplitude and sign determined by the amount and direction of deflection of at least one of these streams, said passage means combining fluid streams so received so as to cancel signals resulting from the deflection of the streams in response to forces of linear acceleration applied to the body at an angle to said axes.

5. A system for measuring the angular rate of rotation of a body about an axis comprising means for establishing at least two streams of fluid having substantially parallel axes and flowing in opposite directions, the axes of said streams moving at an angle other than zero degrees to the axis of rotation of said body, a member having plural channels formed therein for receiving portions of the oppositely directed fluid streams, each channel producing fluid signals having an amplitude and sign determined by the amount and direction of deflection of at least one of these streams from the axis of flow thereof, said channels converging to combine fluid streams received therein so as to cancel fluid signals resulting from the deflection of the streams in response to forces of linear acceleration applied to the body at an angle with respect to said axes.

6. The system as claimed in claim 5 wherein means are provided for establishing two further streams of fluid having parallel axes perpendicular to the axes of the first-mentioned streams of fluid, a channel positioned in said member for receiving each of said further streams of fluid and producing signals having an amplitude and sign determined by the amount and direction of deflection of one of said further streams of fluid from the axis thereof, and combining signals so produced in certain of the other channels to cancel signals resulting from deflection of said two further streams in the same direction.

References Cited

UNITED STATES PATENTS 2,473,903   6/1949   Purifoy _____ 73—515
2,974,532   3/1961   Goshen et al.

FOREIGN PATENTS 68,540   11/1957   France.
81,517   6/1919   Switzerland.

JAMES J. GILL, *Primary Examiner.*